US009942568B2

(12) United States Patent
Han et al.

(10) Patent No.: US 9,942,568 B2
(45) Date of Patent: Apr. 10, 2018

(54) HYBRID TRANSFORM SCHEME FOR VIDEO CODING

(71) Applicant: GOOGLE INC., Mountain View, CA (US)

(72) Inventors: Jingning Han, Santa Clara, CA (US); Yaowu Xu, Saratoga, CA (US); Cheng Chen, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 15/718,401

(22) Filed: Sep. 28, 2017

(65) Prior Publication Data

US 2018/0020240 A1 Jan. 18, 2018

Related U.S. Application Data

(63) Continuation of application No. 14/950,024, filed on Nov. 24, 2015, now Pat. No. 9,807,423.

(51) Int. Cl.

| H04N 19/62 | (2014.01) |
|---|---|
| H04N 19/14 | (2014.01) |
| H04N 19/625 | (2014.01) |
| H04N 19/159 | (2014.01) |
| H04N 19/147 | (2014.01) |
| H04N 19/103 | (2014.01) |
| H04N 19/176 | (2014.01) |
| H04N 19/61 | (2014.01) |

(52) U.S. Cl.
CPC ......... *H04N 19/625* (2014.11); *H04N 19/103* (2014.11); *H04N 19/147* (2014.11); *H04N 19/159* (2014.11); *H04N 19/176* (2014.11); *H04N 19/61* (2014.11)

(58) Field of Classification Search
None
See application file for complete search history.

(56) References Cited

U.S. PATENT DOCUMENTS

| 2009/0238271 | A1* | 9/2009 | Kim ..................... H04N 19/176 375/240.12 |
|---|---|---|---|
| 2016/0029046 | A1* | 1/2016 | Li ........................... H04N 19/42 375/240.2 |

* cited by examiner

*Primary Examiner* — Kevin McInnish

(74) *Attorney, Agent, or Firm* — Young Basile Hanlon & MacFarlane, P.C.

(57) ABSTRACT

An apparatus for decoding a current block from an encoded bitstream includes a memory and a processor. The processor is configured to execute instructions stored in the memory to decode, from the encoded bitstream, a prediction mode of the current block and decode the current block using a transform type selected from a set that includes only a symmetrical discrete sine transform (SDST) and a two-dimensional discrete cosine transform (2D DCT). If the prediction mode is an inter prediction mode, the transform type used is the SDST. If the prediction mode is an intra prediction mode, the transform type used is the 2D DCT.

20 Claims, 6 Drawing Sheets

HYBRID TRANSFORM SCHEME FOR VIDEO CODING

CROSS-REFERENCE TO RELATED APPLICATION(S)

This application claims priority to and the benefit of U.S. application patent Ser. No. 14/950,024, filed Nov. 24, 2015, the entire disclosure of which is hereby incorporated by reference.

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. These techniques often involve transformation into the frequency domain.

SUMMARY

This disclosure relates in general to encoding and decoding visual data, such as video stream data, using a hybrid transform scheme. In particular, a hybrid scheme that uses both discrete cosine transforms and symmetrical discrete sine transforms for inter-predicted blocks is described.

An apparatus for decoding a current block from an encoded bitstream includes a memory and a processor. The processor is configured to execute instructions stored in the memory to decode, from the encoded bitstream, a prediction mode of the current block and decode the current block using a transform type selected from a set that includes only a symmetrical discrete sine transform (SDST) and a two-dimensional discrete cosine transform (2D DCT). If the prediction mode is an inter prediction mode, the transform type used is the SDST. If the prediction mode is an intra prediction mode, the transform type used is the 2D DCT.

Another apparatus for decoding a current block from an encoded bitstream includes a memory and a processor. The processor is configured to execute instructions stored in the memory to decode, from the encoded bitstream, a prediction mode of the current block, on condition that the prediction mode is an inter prediction mode, decode the current block using a transform type selected from a set that includes only a symmetrical discrete sine transform (SDST) and a two-dimensional discrete cosine transform (2D DCT), and, on condition that the prediction mode is an intra prediction mode, decode the current block using a first one-dimensional transform a second one-dimensional transform. The current block has a horizontal dimension and a vertical dimension. The first one-dimensional transform in used in one of the horizontal dimension and the vertical dimension. The second one-dimensional transform is used in the other of the horizontal dimension and the vertical dimension.

A method for decoding a current block from an encoded bitstream includes decoding, from the encoded bitstream, a prediction mode of the current block, the current block comprising rows and columns, on condition that the prediction mode is an inter prediction mode, decode the current block using a transform type selected from a set that includes only a symmetrical discrete sine transform (SDST) and a two-dimensional discrete cosine transform (2D DCT), and on condition that the prediction mode is an intra prediction mode, decode the current block using a first one-dimensional transform a second one-dimensional transform.

Variations in these and other aspects of this disclosure will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

A video stream may be compressed by a variety of techniques to reduce bandwidth required transmit or store the video stream. A video stream can be encoded into a bitstream, which can involve compression, and then transmitted to a decoder that can decode or decompress the video stream to prepare it for viewing or further processing. Encoding a video stream can involve parameters that make trade-offs between video quality and bitstream size, where increasing the perceived quality of a decoded video stream can increase the number of bits required to transmit or store the bitstream.

One technique to achieve superior compression performance exploits spatial and temporal correlation of video signals through spatial and/or motion compensated prediction. Transform coding subsequent to prediction is another technique that improves video compression. Generally, transform coding aims to largely remove the statistical redundancy between residual pixels after prediction. Compression performance of a transform relies on the ability to de-correlate residual pixel redundancy and compact the energy into a subset of transform coefficients.

One common sinusoidal-based transform type used for such decorrelation is a discrete cosine transform (DCT). The DCT has long been used as a near optimal (i.e., Karhunen-Loeve transform) approach for motion compensated prediction residuals. According to the teachings herein, however, it is noted that a symmetric discrete sine transform (SDST) can better capture the statistical properties of certain classes of residual pixels. The hybrid SDST and DCT coding scheme proposed herein expands the set of effective projection angles efficiently, which allows the resulting coefficients to represent residual signals more compactly, while maintaining minimal overhead cost and encoding complexity.

Figure 1:
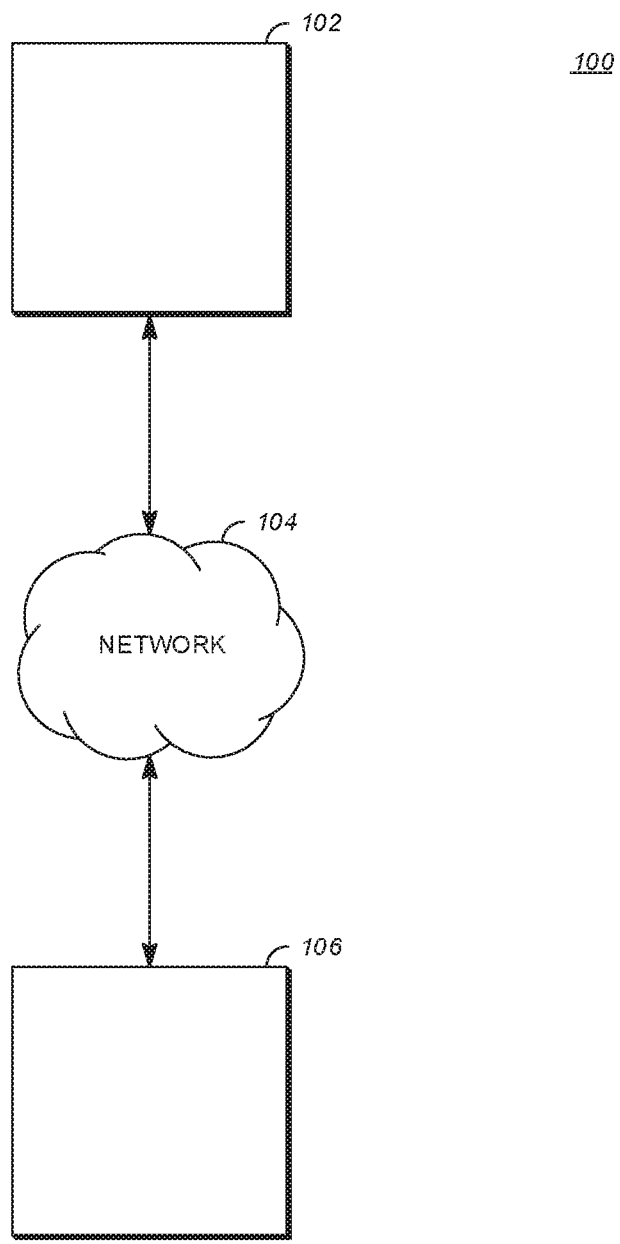
FIG. 1 is a schematic of a video encoding and decoding system.

FIG. 1 is a schematic of a video encoding and decoding system 100. A transmitting station 102 can be, for example, a computer having an internal configuration of hardware such as that described in FIG. 2. However, other suitable implementations of transmitting station 102 are possible.

For example, the processing of transmitting station 102 can be distributed among multiple devices.

A network 104 can connect transmitting station 102 and a receiving station 106 for encoding and decoding of the video stream. Specifically, the video stream can be encoded in transmitting station 102 and the encoded video stream can be decoded in receiving station 106. Network 104 can be, for example, the Internet. Network 104 can also be a local area network (LAN), wide area network (WAN), virtual private network (VPN), cellular telephone network or any other means of transferring the video stream from transmitting station 102 to, in this example, receiving station 106.

Figure 2:
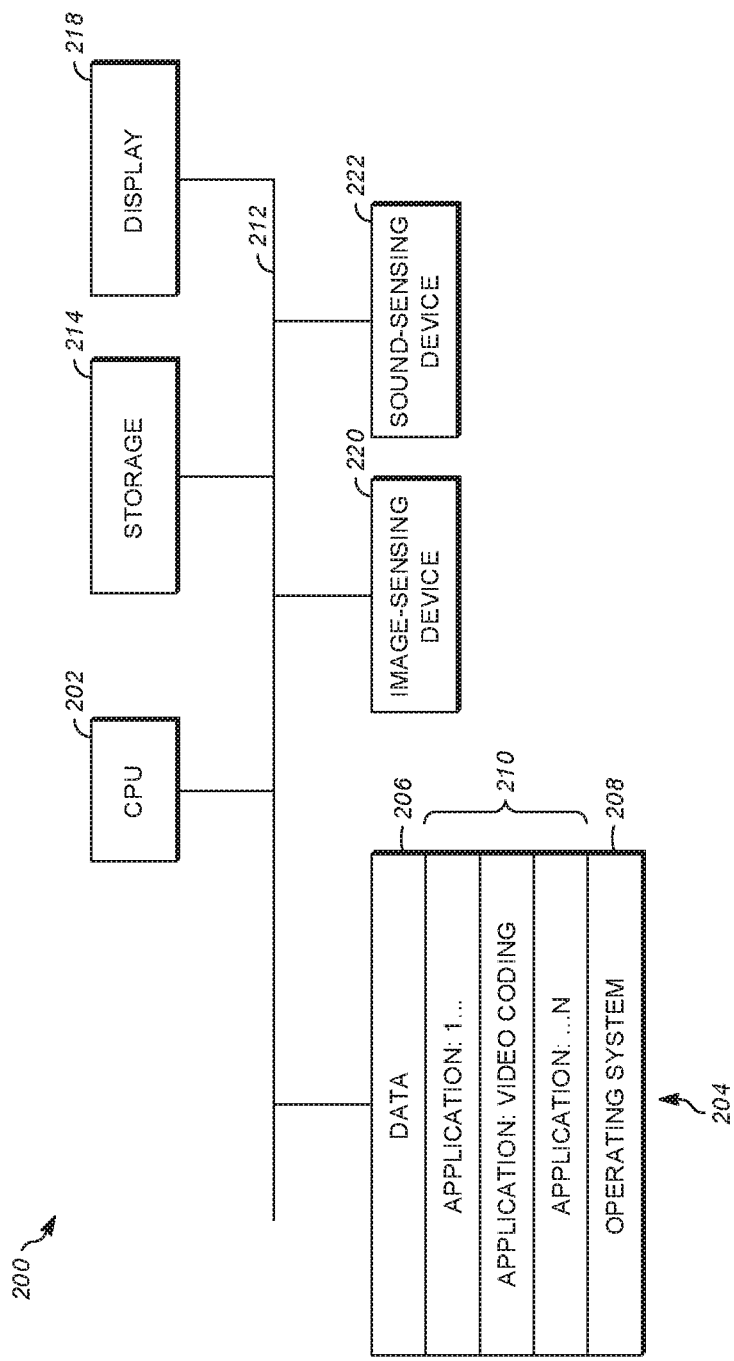
FIG. 2 is a block diagram of an example of a computing device that can implement a transmitting station or a receiving station.

Receiving station 106, in one example, can be a computer having an internal configuration of hardware such as that described in FIG. 2. However, other suitable implementations of receiving station 106 are possible. For example, the processing of receiving station 106 can be distributed among multiple devices.

Other implementations of video encoding and decoding system 100 are possible. For example, an implementation can omit network 104. In another implementation, a video stream can be encoded and then stored for transmission at a later time to receiving station 106 or any other device having memory. In one implementation, receiving station 106 receives (e.g., via network 104, a computer bus, and/or some communication pathway) the encoded video stream and stores the video stream for later decoding. In an example implementation, a real-time transport protocol (RTP) is used for transmission of the encoded video over network 104. In another implementation, a transport protocol other than RTP may be used, e.g., an HTTP-based video streaming protocol.

When used in a video conferencing system, for example, transmitting station 102 and/or receiving station 106 may include the ability to both encode and decode a video stream as described below. For example, receiving station 106 could be a video conference participant who receives an encoded video bitstream from a video conference server (e.g., transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, computing device 200 can implement one or both of transmitting station 102 and receiving station 106 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 202 in computing device 200 can be a conventional central processing unit. Alternatively, CPU 202 can be any other type of device, or multiple devices, capable of manipulating or processing information now-existing or hereafter developed. Although the disclosed implementations can be practiced with a single processor as shown, e.g., CPU 202, advantages in speed and efficiency can be achieved using more than one processor.

A memory 204 in computing device 200 can be a read only memory (ROM) device or a random access memory (RAM) device in an implementation. Any other suitable type of storage device can be used as memory 204. Memory 204 can include code and data 206 that is accessed by CPU 202 using a bus 212. Memory 204 can further include an operating system 208 and application programs 210, the application programs 210 including at least one program that permits CPU 202 to perform the methods described here. For example, application programs 210 can include applications 1 through N, which further include a video coding application that performs the methods described here. Computing device 200 can also include a secondary storage 214, which can, for example, be a memory card used with a mobile computing device 200. Because the video communication sessions may contain a significant amount of information, they can be stored in whole or in part in secondary storage 214 and loaded into memory 204 as needed for processing.

Computing device 200 can also include one or more output devices, such as a display 218. Display 218 may be, in one example, a touch sensitive display that combines a display with a touch sensitive element that is operable to sense touch inputs. Display 218 can be coupled to CPU 202 via bus 212. Other output devices that permit a user to program or otherwise use computing device 200 can be provided in addition to or as an alternative to display 218. When the output device is or includes a display, the display can be implemented in various ways, including by a liquid crystal display (LCD), a cathode-ray tube (CRT) display or light emitting diode (LED) display, such as an OLED display.

Computing device 200 can also include or be in communication with an image-sensing device 220, for example a camera, or any other image-sensing device 220 now existing or hereafter developed that can sense an image such as the image of a user operating computing device 200. Image-sensing device 220 can be positioned such that it is directed toward the user operating computing device 200. In an example, the position and optical axis of image-sensing device 220 can be configured such that the field of vision includes an area that is directly adjacent to display 218 and from which display 218 is visible.

Computing device 200 can also include or be in communication with a sound-sensing device 222, for example a microphone, or any other sound-sensing device now existing or hereafter developed that can sense sounds near computing device 200. Sound-sensing device 222 can be positioned such that it is directed toward the user operating computing device 200 and can be configured to receive sounds, for example, speech or other utterances, made by the user while the user operates computing device 200.

Although FIG. 2 depicts CPU 202 and memory 204 of computing device 200 as being integrated into a single unit, other configurations can be utilized. The operations of CPU 202 can be distributed across multiple machines (each machine having one or more of processors) that can be coupled directly or across a local area or other network. Memory 204 can be distributed across multiple machines such as a network-based memory or memory in multiple machines performing the operations of computing device 200. Although depicted here as a single bus, bus 212 of computing device 200 can be composed of multiple buses. Further, secondary storage 214 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
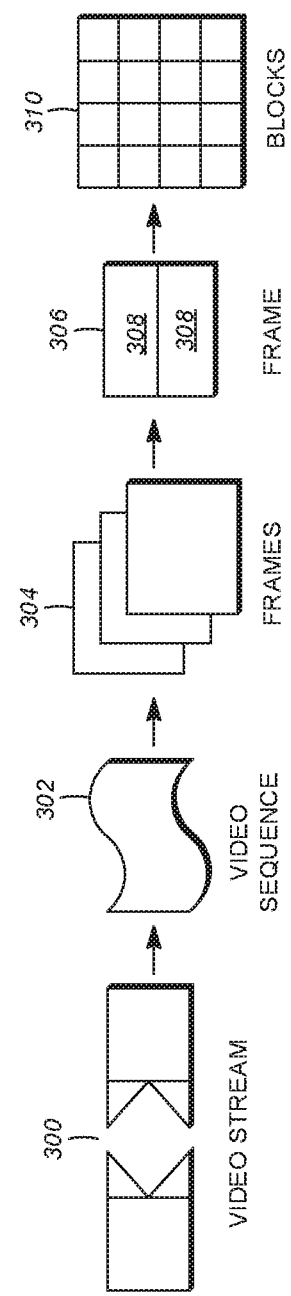
FIG. 3 is a diagram of a typical video stream to be encoded and subsequently decoded.

FIG. 3 is a diagram of an example of a video stream 300 to be encoded and subsequently decoded. Video stream 300 includes a video sequence 302. At the next level, video sequence 302 includes a number of adjacent frames 304. While three frames are depicted as adjacent frames 304, video sequence 302 can include any number of adjacent frames 304. Adjacent frames 304 can then be further subdivided into individual frames, e.g., a single frame 306. At the next level, a single frame 306 can be divided into a series of segments or planes 308. Segments (or planes) 308 can be subsets of frames that permit parallel processing, for example. Segments 308 can also be subsets of frames that can separate the video data into separate colors. For example, a frame 306 of color video data can include a luminance plane and two chrominance planes. Segments 308 may be sampled at different resolutions.

Whether or not frame 306 is divided into segments 308, frame 306 may be further subdivided into blocks 310, which can contain data corresponding to, for example, 16×16 pixels in frame 306. Blocks 310 can also be arranged to include data from one or more planes 308 of pixel data. Blocks 310 can also be of any other suitable size such as 4×4 pixels, 8×8 pixels, 16×8 pixels, 8×16 pixels, 16×16 pixels or larger. Unless otherwise noted, the terms block and macroblock are used interchangeably herein. Frame 306 may be partitioned according to the teachings herein as discussed in more detail below.

Figure 4:
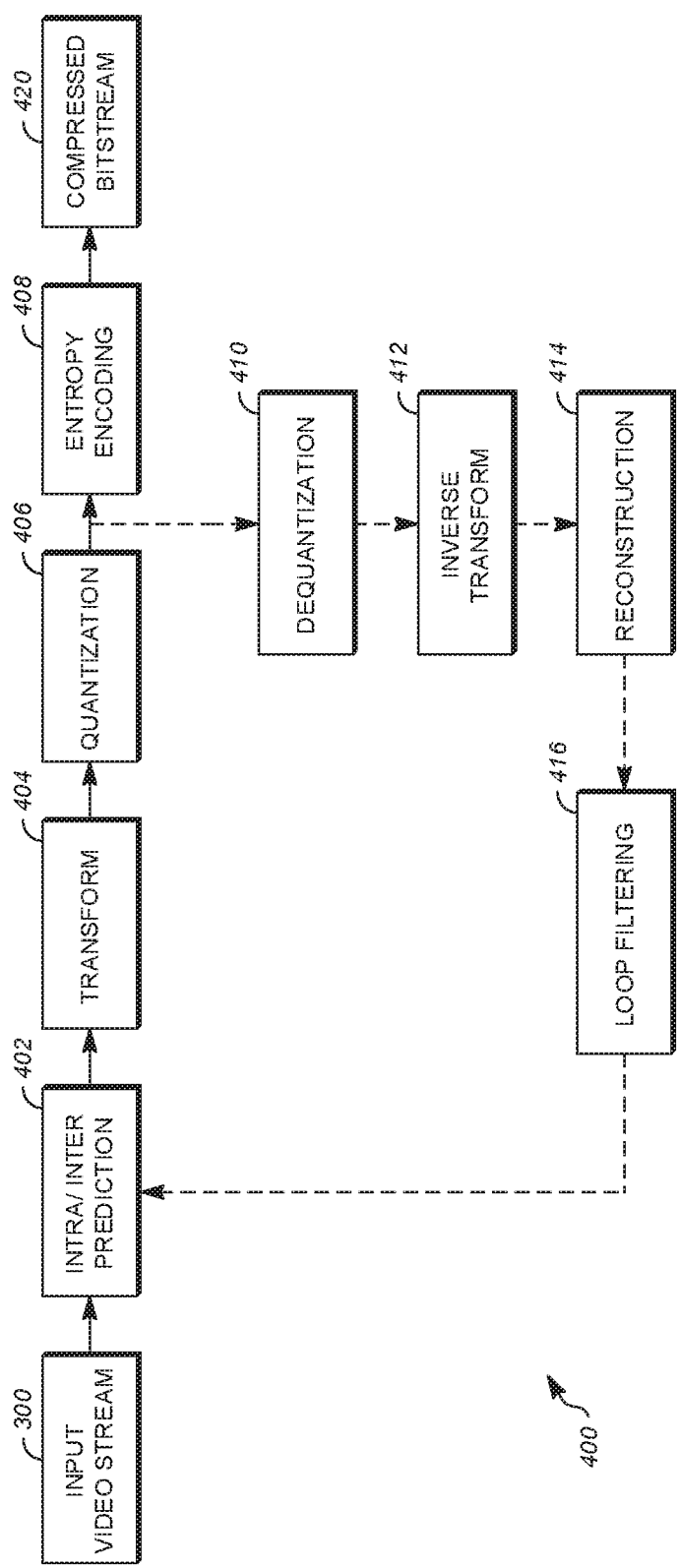
FIG. 4 is a block diagram of a video compression system in according to an aspect of the teachings herein.

FIG. 4 is a block diagram of an encoder 400 in accordance with an implementation. Encoder 400 can be implemented, as described above, in transmitting station 102 such as by providing a computer software program stored in memory, for example, memory 204. The computer software program can include machine instructions that, when executed by a processor such as CPU 202, cause transmitting station 102 to encode video data in the manner described in FIG. 4. Encoder 400 can also be implemented as specialized hardware included in, for example, transmitting station 102. Encoder 400 has the following stages to perform the various functions in a forward path (shown by the solid connection lines) to produce an encoded or compressed bitstream 420 using input video stream 300: an intra/inter prediction stage 402, a transform stage 404, a quantization stage 406, and an entropy encoding stage 408. Encoder 400 may also include a reconstruction path (shown by the dotted connection lines) to reconstruct a frame for encoding of future blocks. In FIG. 4, encoder 400 has the following stages to perform the various functions in the reconstruction path: a dequantization stage 410, an inverse transform stage 412, a reconstruction stage 414, and a loop filtering stage 416. Other structural variations of encoder 400 can be used to encode video stream 300.

When video stream 300 is presented for encoding, each frame 306 can be processed in units of blocks. At intra/inter prediction stage 402, each block can be encoded using intra-frame prediction (also called intra prediction) or inter-frame prediction (also called inter prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, still referring to FIG. 4, the prediction block can be subtracted from the current block at intra/inter prediction stage 402 to produce a residual block (also called a residual). Transform stage 404 transforms the residual into transform coefficients in, for example, the frequency domain using block-based transforms. According to the process described further below with respect to FIG. 6, the residual block may be transformed according to the hybrid SDST and DCT scheme at transform stage 404. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. Note that the size of the prediction block, and hence the residual block, may be different from the size of the transform block as also discussed in more detail below with respect to FIG. 6.

Quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by entropy encoding stage 408. The entropy-encoded coefficients, together with other information used to decode the block, which may include for example the type of prediction used, transform type, motion vectors and quantizer value, are then output to the compressed bitstream 420. Compressed bitstream 420 can be formatted using various techniques, such as variable length coding (VLC) or arithmetic coding. Compressed bitstream 420 can also be referred to as an encoded video stream or encoded video bitstream, and the terms will be used interchangeably herein.

The reconstruction path in FIG. 4 (shown by the dotted connection lines) can be used to ensure that both encoder 400 and a decoder 500 (described below) use the same reference frames to decode compressed bitstream 420. The reconstruction path performs functions that are similar to functions that take place during the decoding process that are discussed in more detail below, including dequantizing the quantized transform coefficients at dequantization stage 410 and inverse transforming the dequantized transform coefficients at inverse transform stage 412 to produce a derivative residual block (also called a derivative residual). At reconstruction stage 414, the prediction block that was predicted at intra/inter prediction stage 402 can be added to the derivative residual to create a reconstructed block. Loop filtering stage 416 can be applied to the reconstructed block to reduce distortion such as blocking artifacts.

Other variations of encoder 400 can be used to encode compressed bitstream 420. For example, a non-transform based encoder 400 can quantize the residual signal directly without transform stage 404 for certain blocks or frames. In another implementation, an encoder 400 can have quantization stage 406 and dequantization stage 410 combined into a single stage.

Figure 5:
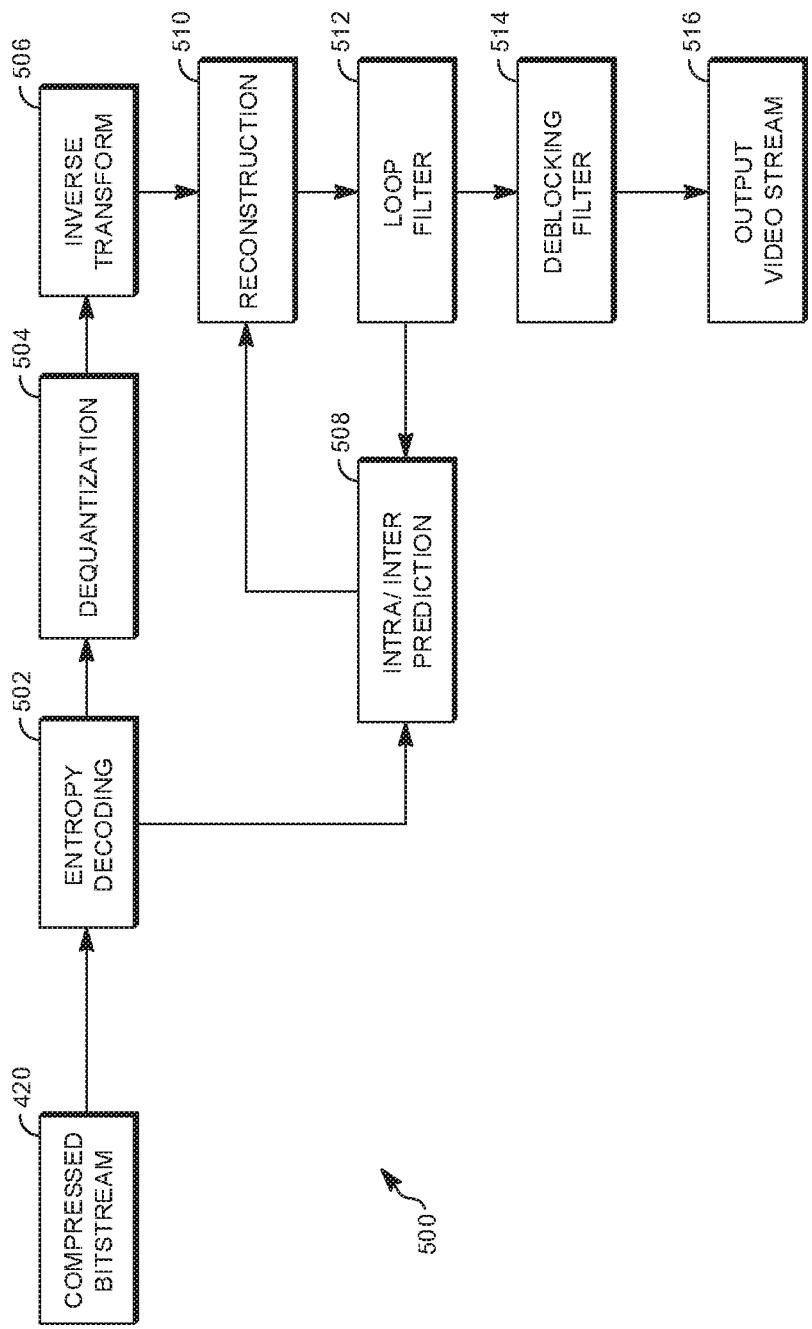
FIG. 5 is a block diagram of a video decompression system according to another aspect of the teachings herein.

FIG. 5 is a block diagram of a decoder 500 in accordance with another implementation. Decoder 500 can be implemented in receiving station 106, for example, by providing a computer software program stored in memory 204. The computer software program can include machine instructions that, when executed by a processor such as CPU 202, cause receiving station 106 to decode video data in the manner described in FIG. 5. Decoder 500 can also be implemented in hardware included in, for example, transmitting station 102 or receiving station 106.

Decoder 500, similar to the reconstruction path of encoder 400 discussed above, includes in one example the following stages to perform various functions to produce an output video stream 516 from compressed bitstream 420: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of decoder 500 can be used to decode compressed bitstream 420.

When compressed bitstream 420 is presented for decoding, the data elements within compressed bitstream 420 can be decoded by entropy decoding stage 502 as discussed in additional detail herein to produce a set of quantized transform coefficients. Dequantization stage 504 dequantizes the quantized transform coefficients (e.g., by multiplying the quantized transform coefficients by the quantizer value), and inverse transform stage 506 inverse transforms the dequantized transform coefficients using the selected transform type to produce a derivative residual that can be identical to that created by inverse transform stage 412 in encoder 400. Using header information decoded from compressed bitstream 420, decoder 500 can use intra/inter prediction stage 508 to create the same prediction block as was created in encoder 400, e.g., at intra/inter prediction stage 402. At reconstruction stage 510, the prediction block can be added to the derivative residual to create a reconstructed block. Loop filtering stage 512 can be applied to the reconstructed block to reduce blocking artifacts. Other filtering can be applied to the reconstructed block. In this example, deblocking filtering stage 514 is applied to the reconstructed block to reduce blocking distortion, and the result is output as output video stream 516. Output video stream 516 can also be referred to as a decoded video stream, and the terms will be used interchangeably herein.

Other variations of decoder 500 can be used to decode compressed bitstream 420. For example, decoder 500 can produce output video stream 516 without deblocking filtering stage 514.

As mentioned briefly above, residuals (and particularly inter-frame residuals) are often coded using the DCT as a theoretical approximation of the optimal transformation, Karhunen-Loeve transform (KLT), with further desired properties such as independent of signal statistics and fast computation flow. The DCT approximates the KLT well under the assumption that the signal follows a Gauss-Markov model, which is the case for typical natural image pixels. Its efficacy for motion compensated prediction residuals, however, is questionable as the correlation is much lower among the prediction residuals and the Gauss-Markov model is not a good fit in many circumstances.

Described herein for use in encoding prediction residuals is a symmetric discrete sine transform (SDST). The SDST kernel may be defined as:

$$X(k) = \sum_{n=0}^{N-1} x(n) * \sin\left(\frac{(n+1)*(k+1)\pi}{(N+1)}\right).$$

In this equation, n is the time (pixel) domain index, k is the frequency domain index, N is the number of pixel values within the prediction residual, x(n) is the time (pixel) domain signal (e.g., the pixel value for the pixel at index n), and X(k) is the transform domain representation at index k.

Like the DCT kernel, the SDST kernel holds the property that it is independent of signal statistics. The SDST provides a rather distant projection angle to the DCT. Accordingly, it effectively captures the statistical properties of certain signal class. The proposed hybrid SDST/DCT coding scheme switches between the two transform types for motion compensated prediction residuals. Alternating between SDST and DCT allows a video coder to represent an original residual signal in a more compact form, i.e., with better energy compaction and signal decorrelation, than using only the DCT, for example.

One example of implementing such a hybrid scheme is described next with respect to FIG. 6, which is a flowchart diagram of a process 600 for encoding a video signal using a hybrid transform scheme. Process 600 can be implemented in a system such as computing device 200 to aid the encoding of a video stream. Process 600 can be implemented, for example, as a software program that is executed by a computing device such as transmitting station 102 or receiving station 106. The software program can include machine-readable instructions that are stored in a memory such as memory 204 that, when executed by a processor such as CPU 202, cause the computing device to perform process 600. Process 600 can also be implemented using hardware in whole or in part. As explained above, some computing devices may have multiple memories and multiple processors, and the steps or operations of process 600 may in such cases be distributed using different processors and memories. Use of the terms "processor" and "memory" in the singular herein encompasses computing devices that have only one processor or one memory as well as devices having multiple processors or memories that may each be used in the performance of some but not necessarily all recited steps.

For simplicity of explanation, process 600 is depicted and described as a series of steps or operations. However, steps and operations in accordance with this disclosure can occur in various orders and/or concurrently. Additionally, steps or operations in accordance with this disclosure may occur with other steps or operations not presented and described herein. Furthermore, not all illustrated steps or operations may be required to implement a method in accordance with the disclosed subject matter. Process 600 is depicted for encoding of a single block of a single frame. Process 600 may be repeated for some or all blocks of the single frame and/or be repeated for each frame of the input signal. Blocks may be processed in any scan order, such as raster-scan order.

Process 600 initiates by receiving an input signal at operation 602. The input signal is a video signal to be encoded. Receiving the signal can include receiving the signal from a video screen, receiving it from a video camera, retrieving the signal from a memory device within or coupled to a processor or remote from the processor, or any other way of receiving the signal for processing.

At operation 604, a residual is generated using a current block to be encoded from a frame of the signal. As discussed above, a residual block may be generated, calculated or otherwise produced by selecting a prediction mode and generating a prediction block using the prediction mode, where a difference between the prediction block and the current block is the residual block, also called the residual.

At operation 606, a query is made regarding the prediction mode used. As shown, a query is made as to whether an inter prediction mode was used to generate the residual. However, the query could ask instead whether an intra prediction mode was used to generate the residual. When an inter prediction mode was used to generate the residual, process 600 advances to operation 608.

At operation 608, two different transform modes (and hence, transforms) are respectively applied to the residual. In this example, the residual is transformed using the DCT, and the residual is also transformed using the SDST. The transforms can be applied sequentially or separately but concurrently to the residual. This operation results in two transform blocks comprising a plurality of transform coefficients. Each transform block is encoded and a rate-distortion value associated with the transform block is calculated at operation 610.

Encoding a transform block at operation 608 generally includes quantizing the transform coefficients of the transform block and generating header information including how the block was encoded. In some implementations, quantizing the transform coefficients may be omitted and encoding at operation 608 is completed by generating the header information only. In order to calculate rate-distortion values at operation 610, the encoded block is decoded using the header information. Operation 608 forms part of the rate-distortion loop for encoding the current block. A rate-distortion loop determines the rate, or number of bits output from the encoding process versus the distortion, or change in visual quality of the video stream as a result of encoding and decoding. Distortion can be measured in a number of different ways including measuring the mean squared error (difference) between the data of the video stream before encoding and decoding and the data of the video stream following encoding and decoding. Thus, a rate-distortion value is a measure of the number of bits required to represent the encoded block (or other subdivision of a video stream) for a given level of distortion.

In contrast, if an intra prediction mode is used as indicated by the response to the query of operation 606, process 600 advances to operation 612. At operation 612, one or more transform modes are respectively applied to the residual. Each of these transform modes is other than the SDST transform mode. In one implementation, the only transform modes available are the DCT and the SDST. Accordingly, the residual generated by intra prediction is transformed using the DCT. This implementation has the desirable result that only one bit need be coded in a header to indicate the type of transform used as the transform mode. The size of the transform used as the transform mode, as discussed in more detail below, could be separately signaled if sized differently from the prediction block and hence different from the residual. For example, the size could be transmitted by including a coding tree within the bitstream that describes the partitioning of blocks into prediction blocks and transform blocks. Other ways of transmitting the size are possible to the extent the sizes of the residual and transform block (also referred to as sub-blocks of the residual herein) are different.

In some implementations, other transform modes are possible. Another two-dimensional (2D) transform other than the DCT may be applied to the residual. An alternative that is desirable with residuals that have been generated via intra prediction is to perform a series of 1D transforms on the rows and columns of the block. For example, the 2D array of residual pixels can be transformed by first applying one-dimensional (1D) transforms to the columns (vertically-arranged pixels) of a block followed by applying 1D transforms to the rows (horizontally-arranged pixels) or vice-versa. Generally, for example, the variance of the residual generated using intra prediction will be lowest at the prediction edge and will be highest at the opposite side of the prediction edge. For this reason, the use of different kernels for the rows and columns of the block may be desirable.

In one example of this variation, combinations of a 1D DCT and a 1D Asymmetric Discrete Sine Transform (ADST) may be selected such that their base functions match the pattern of the residual (i.e., the directionality of the prediction mode). For horizontal and horizontal-like intra prediction modes that rely primarily on values in the left-hand column to the current block, ADST may be used in the horizontal direction and DCT in the vertical direction. Similarly, for vertical or vertical-like intra prediction modes that rely primarily on values in a top row of pixels above the current block, ADST may be used in the vertical direction and DCT in the horizontal direction. For generally diagonal modes that rely on both top row and left-hand column values in a substantially similar manner, ADST may be used in both the horizontal and vertical directions. For other intra prediction modes, there may be no particular benefit to be gained from using ADST in either direction. Accordingly, the 1D DCT may be used in each of the horizontal and vertical directions, or the 2D DCT may be used for the entire residual as described above with regard to operation 608.

For each of the transform modes applied at operation 612, process 600 generates rate-distortion values at operation 614 in a like manner as at operation 610. Regardless of whether the rate-distortion values are generated at operation 610 or at operation 614, process 600 advances to operation 616 to determine whether more prediction modes are available for testing.

As mentioned briefly above, prediction modes encompass inter- and intra-prediction. Intra-prediction may include a number of modes indicating the direction of pixel propagation used to generate the prediction block. In some cases, prediction modes may be associated with a size. For example, the block may be a large block that is predicted according to a number of prediction modes such as a 4×4 inter-prediction mode, an 8×8 inter-prediction mode, several 4×4 intra-prediction modes and several 8×8 intra-prediction modes by appropriately dividing the large block.

If additional prediction modes are available, process 600 advances to step 618, where the rate-distortion values calculated at operation 610 or at operation 614 are stored for later use. Then, process 600 is performed for the next prediction mode starting with the generation of the residual at operation 604.

If additional prediction modes are not available, process 600 advances to operation 620 to select the transform mode and prediction mode that results in the lowest rate-distortion value for encoding the current block. This may be achieved at operation 620 by comparing the various generated rate-distortion values. The modes associated with the lowest rate-distortion value are desirably selected to encoding the block. Generally, multiple prediction modes are used to generate a number of residual blocks in process 600. However, in a simple example assuming only inter prediction mode and only one intra prediction mode are available, the lowest of a first rate-distortion value for encoding the residual block using the DCT, a second rate-distortion value for encoding the residual block using the SDST, and a third rate-distortion value for encoding the residual block using other than the SDST would be used to decide whether to use the inter prediction mode with the DCT, the inter prediction mode with the SDST, or the intra prediction mode with the transform mode used at operation 612.

After operation 620, the block is encoded into an encoded bitstream at operation 622. Encoding the resulting transform block may include entropy coding the transform block by entropy coding the transform coefficients in a scan order such as a zig-zag scan order. In some cases, encoding the resulting transform block includes quantizing the transform coefficients of the transform block and then entropy coding the transform block by entropy coding the quantized transform coefficients in a scan order such as a zig-zag scan order.

Figure 6:
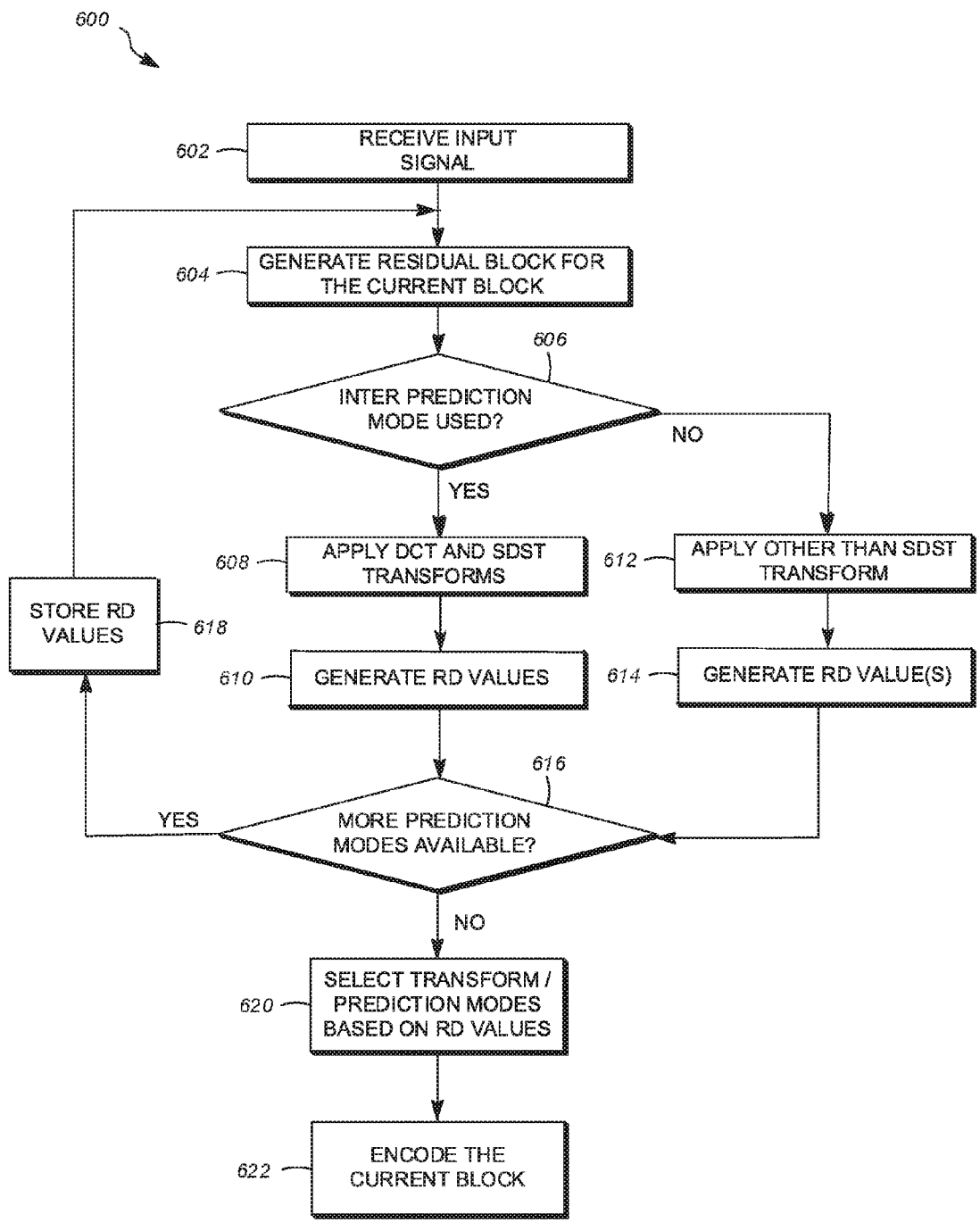
FIG. 6 is a flowchart diagram of a process for encoding a video signal using a hybrid transform scheme.

Although not expressly shown in FIG. 6, it is possible that the transform mode includes different transform sizes. For example, a minimum block size may be specified for transform mode (for example, 4×4 pixels). In this case, if the residual block generated at operation 604 is above the minimum block size for the transform mode, additional processing may be included to partition the residual block into non-overlapping residual sub-blocks. Then, each sub-block could be processed according to operations 606-614. In this way, respective rate-distortion values are generated for each sub-block. Desirably, the same type of transform is applied to each sub-block residual so that the rate-distortion values can be combined for comparison with other prediction and transform modes for the current block to determine the best coding for the current block.

For example, the respective rate-distortion values generated for each residual sub-block of the residual block can be combined to generate a combined rate-distortion value for encoding the residual block using the DCT when the inter prediction mode is used. Similarly, the respective rate-distortion values generated for each residual sub-block of the residual block can be combined to generate a combined rate-distortion value for encoding the residual block using the SDST when inter prediction is used. When the prediction mode is the intra prediction mode, the respective rate-distortion values generated for each residual sub-block of the residual block can be combined to generate a combined rate-distortion value for encoding the residual block using other than the SDST, such as DCT or ADST or combinations of DCT and ADST. The combining of the values may be achieved via summation or some other technique of combining the values. In this way, encoding a residual block using one larger transform can be compared to encoding the residual block using smaller transforms. Selecting the transform mode and the prediction mode would thus include selecting the transform size (i.e., selecting whether to encode the current block by transforming the residual block or transforming the residual sub-blocks).

Optionally, the selected coding may include whether or not quantization is performed as part of the encoding process.

In the description above, the encoding and calculation of rate-distortion values at operation 610 or operation 614 occurs for each sub-block. That is, each sub-block transformed using the DCT is separately encoded and decoded to calculate respective rate-distortion values, which are then summed for a single rate-distortion value for the current block that is associated with the particular prediction mode and transform mode—the DCT and the transform size. Similarly, each sub-block transformed using the SDST or other transform is separately encoded and decoded to calculate respective rate-distortion values, which are then summed for a single rate-distortion value for the current block that is associated with the particular prediction mode and transform mode. More commonly, this calculation is done at the block level, not the sub-block level as the header bits are generally associated with the block. For example, the transform coefficients resulting from the transformation of the sub-blocks using the DCT, the SDST or otherwise are combined for encoding, optionally using quantization, and are decoded to generate a rate-distortion value for the whole residual block without calculating separate rate-distortion values for each sub-block. It is less desirable, but possible, that combinations of transform type may be used for sub-blocks of a larger residual block. In such a case, the number of bits needed to signal the transform modes would increase.

As mentioned, the order of operations and content of process 600 may vary. For example, process 600 is described where the prediction mode and transform mode are selected on a per-block basis using a single rate-distortion loop. In one alternative implementation, the best inter prediction mode for a block using only the DCT may be selected in one rate-distortion loop, the best inter prediction mode for the block using only the SDST may be selected in a separate loop, and the best intra prediction mode for the block using one transform mode for each available transform mode may be selected in respective rate-distortion loops. Other combinations are possible. In such examples, the better combination of prediction mode and transform mode is selected for the block. Further, process 600 uses the same transform type for all sub-blocks of a residual block when the block is partitioned at operation 620. This is expected to be more efficient for coding as signaling of the transform type is not required for sub-blocks, and decoding the block can rely upon one-time signaling of the transform type (including size) regardless of how many sub-blocks exist. Moreover, the rate-distortion loop is computationally intense, and using the same transform type for sub-blocks involves fewer computations than alternatives. It is possible, however, that various combinations of transforms are used in generating rate-distortion values for the sub-blocks to select transform type(s) for those sub-blocks. The techniques described herein also work where additional processing is used to limit the number of prediction modes.

In some cases, all of the generated rate-distortion values may not be compared at operation 620. For example, when multiple passes of the loop are performed (e.g., for different transform types, different block/sub-block sizes, or different prediction modes), the rate-distortion values generated may be compared so that only the lowest rate-distortion value is stored in association with its prediction mode and transform mode (e.g., transform type and transform size). Then, each new rate-distortion value may be compared to that lowest value and stored if it is the lower than the previously-stored value or discarded if it is not lower than the previously-stored value.

The decoding process of a video bitstream encoded as described herein may be as described with respect to FIG. 5. In the data sent within the bitstream, one or more bits may be used within a header to indicate the prediction mode and the transform mode (e.g., a transform size and type). When quantization is omitted from the encoding of a block, dequantization is omitted from decoding of the block.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other suitable transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for decoding a current block from an encoded bitstream, the apparatus comprising:
   a memory; and
   a processor configured to execute instructions stored in the memory to:
      decode, from the encoded bitstream, a prediction mode of the current block; and
      decode the current block using a transform type selected from a set consisting of a symmetrical discrete sine transform (SDST) and a two-dimensional discrete cosine transform (2D DCT), wherein
         on condition that the prediction mode is an inter prediction mode, the transform type is the SDST, and
         on condition that the prediction mode is an intra prediction mode, the transform type is the 2D DCT.

2. The apparatus of claim 1, wherein the instructions to determine, from the encoded bitstream, the prediction mode of the current block further comprise instructions to:
   read a single bit from the encoded bitstream to determine the prediction mode.

3. The apparatus of claim 1, wherein the current block comprises sub-blocks, and wherein the instructions to decode the current block using the SDST comprise instructions to:
   decode, from the encoded bitstream, a size of the SDST to be used to decode at least one sub-block of the sub-blocks.

4. The apparatus of claim 1, wherein the current block comprises sub-blocks, and wherein the instructions to decode the current block comprise instructions to:
   decode, from the encoded bitstream, a size of the 2D DCT to be used to decode at least one sub-block of the sub-blocks.

5. An apparatus for decoding a current block from an encoded bitstream, the apparatus comprising:
   a memory; and
   a processor configured to execute instructions stored in the memory to:
      decode, from the encoded bitstream, a prediction mode of the current block, the current block having a horizontal dimension and a vertical dimension;
      on condition that the prediction mode is an inter prediction mode, decode the current block using a transform type selected from a set consisting of a symmetrical discrete sine transform (SDST) and a two-dimensional discrete cosine transform (2D DCT); and
      on condition that the prediction mode is an intra prediction mode, decode the current block using a first one-dimensional transform a second one-dimensional transform, wherein
         the first one-dimensional transform in used in one of the horizontal dimension and the vertical dimension, and
         the second one-dimensional transform is used in the other of the horizontal dimension and the vertical dimension.

6. The apparatus of claim 5, wherein the first one-dimensional transform and the second one-dimensional transform are selected from a set consisting of one-dimensional DCT (1D DCT) and a one-dimensional asymmetric discrete sine transform (1D ADST),
   wherein the first one-dimensional transform is used in the horizontal dimension of the current block and the second one-dimensional transform is used in the vertical dimension of the current block.

7. The apparatus of claim 6, wherein the first one-dimensional transform and the second one-dimensional transform are selected based on the prediction mode.

8. The apparatus of claim 6, wherein the first one-dimensional transform is the 1D ADST and the second one-dimensional transform is the 1D DCT.

9. The apparatus of claim 6, wherein the first one-dimensional transform is the 1D DCT and the second one-dimensional transform is the 1D ADST.

10. The apparatus of claim 6, wherein the first one-dimensional transform is the 1D ADST and the second one-dimensional transform is the 1D ADST.

11. The apparatus of claim 6, wherein the first one-dimensional transform is the 1D DCT and the second one-dimensional transform is the 1D DCT.

12. The apparatus of claim 5, wherein the current block is a sub-block of a prediction block, and wherein the instructions further comprise instructions to:
    read a transform block size for the current block from the encoded bitstream.

13. A method for decoding a current block from an encoded bitstream, the method comprising:
    decoding, from the encoded bitstream, a prediction mode of the current block, the current block comprising rows and columns;
    on condition that the prediction mode is an inter prediction mode, decode the current block using a transform type selected from a set consisting of a symmetrical discrete sine transform (SDST) and a two-dimensional discrete cosine transform (2D DCT); and
    on condition that the prediction mode is an intra prediction mode, decode the current block using a first one-dimensional transform a second one-dimensional transform.

14. The method of claim 13, wherein the first one-dimensional transform and the second one-dimensional transform are selected from a set consisting of one-dimensional DCT (1D DCT) and a one-dimensional asymmetric discrete sine transform (1D ADST),
    wherein the first one-dimensional transform is used in a horizontal direction of the current block and the second one-dimensional transform is used in a vertical direction of the current block.

15. The method of claim 14, wherein the first one-dimensional transform and the second one-dimensional transform are selected based on the prediction mode.

16. The method of claim 14, wherein the first one-dimensional transform is the 1D ADST and the second one-dimensional transform is the 1D DCT.

17. The method of claim 14, wherein the first one-dimensional transform is the 1D DCT and the second one-dimensional transform is the 1D ADST.

18. The method of claim 14, wherein the first one-dimensional transform is the 1D ADST and the second one-dimensional transform is the 1D ADST.

19. The method of claim 14, wherein the first one-dimensional transform is the 1D DCT and the second one-dimensional transform is the 1D DCT.

20. The method of claim 13, wherein the current block is a sub-block of a prediction block, and wherein the method further comprises:
    reading a transform block size for the current block from the encoded bitstream.

* * * * *